United States Patent
Powell et al.

(10) Patent No.: US 7,267,169 B2
(45) Date of Patent: Sep. 11, 2007

(54) METHODS FOR FORMING A PERMEABLE AND STABLE MASS IN A SUBTERRANEAN FORMATION

(75) Inventors: Ronald J. Powell, Duncan, OK (US); Alexander Bismarck, Coventry (GB); Angelika Menner, London (GB)

(73) Assignee: Halliburton Energy Services, Inc., Duncan, OK (US)

( * ) Notice: Subject to any disclaimer, the term of this patent is extended or adjusted under 35 U.S.C. 154(b) by 177 days.

(21) Appl. No.: 11/061,348

(22) Filed: Feb. 21, 2005

(65) Prior Publication Data

US 2006/0185846 A1    Aug. 24, 2006

(51) Int. Cl.
*E21B 43/02* (2006.01)
(52) U.S. Cl. ...................... 166/276; 166/311
(58) Field of Classification Search ...................... None
See application file for complete search history.

(56) References Cited

U.S. PATENT DOCUMENTS

| | | | | |
|---|---|---|---|---|
| 3,322,695 A | | 5/1967 | Alfrey et al. ................. 260/2.5 |
| 4,074,760 A | | 2/1978 | Copeland et al. ........... 166/276 |
| 4,247,430 A | | 1/1981 | Constien .............. 260/29.2 EP |
| 4,522,953 A | | 6/1985 | Barby et al. .................. 521/64 |
| 5,977,194 A | * | 11/1999 | Mork et al. .................... 521/61 |
| 6,213,209 B1 | | 4/2001 | Nguyen et al. ............. 166/276 |
| 6,302,209 B1 | | 10/2001 | Thompson et al. ...... 166/305.1 |
| 6,394,185 B1 | * | 5/2002 | Constien ...................... 166/296 |
| 6,631,764 B2 | * | 10/2003 | Parlar et al. ................. 166/278 |
| 6,818,594 B1 | * | 11/2004 | Freeman et al. ............ 507/101 |
| 2004/0213905 A1 | * | 10/2004 | Breen et al. ................. 427/230 |
| 2005/0115710 A1 | * | 6/2005 | Kotlar et al. ................ 166/295 |
| 2006/0048938 A1 | * | 3/2006 | Kalman ....................... 166/278 |

OTHER PUBLICATIONS

Aggour, M.A., et al., "Investigation of in-situ low-temperature oxidation as a viable sand consolidation technique," *Journal of Petroleum Science and Engineering* 42, pp. 107-120, 2004.
Benson, J.R., "Highly porous polymers," *American Laboratory*, vol. 35, No. 10, pp. 44-52, May 2003.

* cited by examiner

*Primary Examiner*—Brian E. Glessner
*Assistant Examiner*—Angela DiTrani
(74) *Attorney, Agent, or Firm*—Robert A. Kent; Baker Botts

(57) ABSTRACT

This invention relates to subterranean treatment operations. More particularly, this invention provides methods that may be useful in providing void-free barriers between a subterranean formation and a portion of a well bore. A nonlimiting example of a method is a method of degrading a filter cake in a subterranean formation. Another nonlimiting example of a method is a method of producing hydrocarbons from a subterranean formation.

17 Claims, 1 Drawing Sheet

METHODS FOR FORMING A PERMEABLE AND STABLE MASS IN A SUBTERRANEAN FORMATION

BACKGROUND

The present invention relates to subterranean treatment operations. More particularly, the present invention provides methods that may be useful in providing void-free barriers between a subterranean formation and a portion of a well bore.

Hydrocarbon production from subterranean formations commonly involves, inter alia, drilling a well bore that penetrates the hydrocarbon-bearing formation, and producing hydrocarbon fluids (e.g., oil and/or gas) through the well bore to the surface. When the formation is one that may be characterized as poorly or weakly consolidated, efficient hydrocarbon production may be complicated by, inter alia, well bore instability and the production of "fines" from the formation. Production of fines (e.g., particles from the formation) along with the produced fluids is undesirable, as they may damage both downhole equipment and surface equipment, and must be disposed of in an environmentally-acceptable manner.

Conventional attempts to address the problems of well bore instability and formation fines production have involved operations referred to as "gravel packing." Commonly, a gravel packing operation may involve placing a sand slurry into an annulus between a screen-wrapped perforated pipe (the "screen") and the walls of the well bore, thereby forming a sand filter between the two. The sand (often referred to as "gravel") may be of a specific size designed to prevent the passage of unconsolidated formation particles. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating formation particles, and stabilizes the weak formation, while still permitting fluid flow. The gravel, inter alia, acts to prevent the particulates from occluding the screen or migrating with the produced fluids, and the screen, inter alia, acts to prevent the gravel from entering the production tubing.

Occasionally, expandable screens have been placed in subterranean formations as an alternative to the placement of a conventional gravel pack. Once placed within the well bore, the expandable screen may be expanded or inflated against the walls of the well bore.

Conventional gravel packing operations, as well as operations involving the use of expandable screens, have been problematic. Bridging of sand particles within the gravel pack may occur, which may create voids within the gravel pack. Void spaces also may occur with expandable screens. When a well bore is drilled in a soft formation, formation material may be washed out in certain locations, which may enlarge the diameter of the bore hole in the washed-out regions. Generally, expandable screens are expanded through the use of a fixed-diameter die. Accordingly, in a uniform-diameter borehole, the expanded screen generally will make contact with substantially the entirety of the formation, and be void-free. However, in locations that have been washed out to a larger diameter, or into an irregular shape, the expanded screen will be unable to contact substantially the entirety of the formation, and voids will be present.

The presence of voids generally is undesirable, as they may result in mechanical failures, among other things. Generally, voids will reduce the ability of an expanded screen or gravel pack to filter or restrain particles or fines produced from the subterranean formation along with produced fluids. Fines may damage both downhole and surface equipment, due in part to the relatively high velocity with which fluids carrying the fines may move through the gravel pack or screen. For example, particles carried along with produced fluid may impinge on the expandable screen, abrading a hole therein. Furthermore, any produced formation material must be disposed of in an environmentally-acceptable manner, which adds expense to the cost of producing the well.

SUMMARY

The present invention relates to subterranean treatment operations. More particularly, the present invention provides methods that may be useful in providing void-free barriers between a subterranean formation and a portion of a well bore.

An example of a method of the present invention is a method comprising: providing a composition that comprises a water-in-oil emulsion, the water-in-oil emulsion comprising a continuous organic phase and an internal aqueous phase, the continuous organic phase comprising a surfactant, an initiator, a crosslinking monomer and a stress-reducing monomer; placing the composition in a subterranean formation; and permitting the composition to form a permeable, substantially solid material therein.

Another example of a method of the present invention is a method of degrading a filter cake in a subterranean formation comprising: providing a portion of a subterranean formation comprising a filter cake disposed thereon; providing a conduit having a degradable material disposed along its length; placing the conduit within the formation; permitting the degradable material to degrade to form a degradation product; permitting the degradation product to contact the filter cake; and permitting the filter cake to degrade.

Another example of a method of the present invention is a method of producing hydrocarbons from a subterranean formation comprising: providing a portion of a subterranean formation comprising a filter cake disposed thereon; providing a conduit having a degradable material disposed along its length; placing the conduit within the formation; providing a composition that comprises a water-in-oil emulsion, the water-in-oil emulsion comprising a continuous organic phase and an internal aqueous phase, the continuous organic phase comprising a surfactant, an initiator, a crosslinking monomer and a stress-reducing monomer; circulating the composition into the formation such that the composition is disposed between the filter cake and the degradable material; permitting the degradable material to degrade to form a degradation product; permitting the degradation product to contact the filter cake; permitting the filter cake to degrade; and permitting hydrocarbons within the formation to flow through the composition, into the conduit, to the surface.

Other and further objects, features and advantages of the present invention will be readily apparent to those skilled in the art upon a reading of the description of preferred embodiments which follows.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
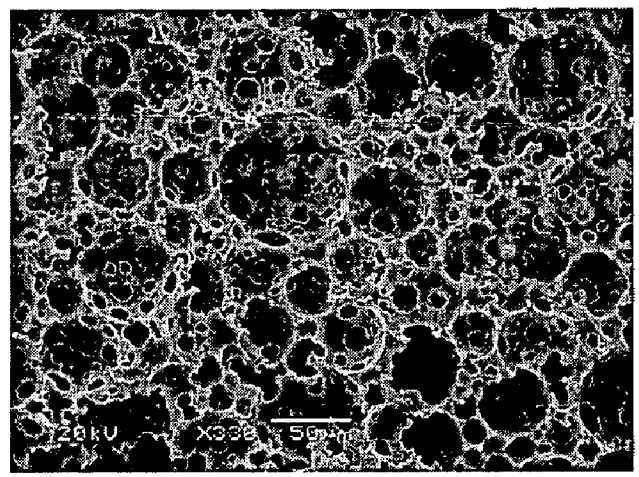
FIG. 1 is a Scanning Electron Microscope ("SEM") Image of Sample Composition No. 1.

The present invention relates to subterranean treatment operations. More particularly, the present invention provides methods that may be useful in providing void-free barriers between a subterranean formation and a portion of a well bore. Though the methods of the present invention may find application in a broad variety of circumstances, they may be particularly suitable, inter alia, in horizontal well completions, and in open-hole completions in poorly consolidated formations.

Generally, the methods of the present invention involve the use, in subterranean treatment operations, of compositions that comprise water-in-oil emulsions. The compositions that comprise water-in-oil emulsions generally have very large internal phase volume fractions. The compositions may be placed in desired locations within a subterranean formation (e.g., they may be disposed in portions of a well bore), whereupon they may be permitted to polymerize (e.g., "cure" to form a permeable, substantially solid material) at a desired time. The cured compositions generally form a void-free barrier between the formation and the portion of the well bore wherein the composition is disposed.

I. The Compositions Useful with the Present Invention

The compositions useful with the present invention generally comprise a water-in-oil emulsion that comprises a continuous organic phase and Generally, the organic phase may comprise an initiator, at least one surfactant, at least one crosslinking monomer, and at least one stress-reducing monomer. In certain embodiments of the present invention, the compositions further may comprise optional filler materials. Generally, the organic phase may be present in the emulsion in an amount in the range of from about 16% to about 40% by volume of the emulsion. In certain embodiments, the organic phase may be present in the emulsion in an amount in the range of from about 20% to about 30% by volume of the emulsion.

A broad variety of initiators may be used in the organic phase. Suitable initiators generally include those that are soluble in the organic phase. Examples of suitable initiators include, but are not limited to, $\alpha,\alpha'$-azoisobutyronitrile (AIBN). Generally, the initiator may be present within the organic phase in an amount in the range of from about 1 mol % to about 2 mol %. The choice of initiator to be included may depend on factors such as, inter alia, the temperature that may be encountered within the formation. For example, AIBN may be particularly useful for applications wherein the formation temperature may be in the range of from about 60° C. to about 90° C., while 2,2'-azodi(2-methylbutyronitrile) may be particularly useful for applications wherein the formation temperature may be in the range of from about 70° C. to about 110° C. As another example, 2,2-di(4,4-di(tertbutylperoxy)cyclohexyl)propane may be particularly useful for applications wherein the formation temperature may be in the range of from about 90° C. to about 120° C., while di-cumylperoxide may be particularly useful for applications wherein the formation temperature may be in the range of from about 110° C. to about 165° C.

A broad variety of surfactants may be used in the organic phase. Suitable surfactants generally may be non-ionic, and may have an HLB value in the range of between about 4.2 and about 8.6. In certain embodiments of the present invention, a mixture of surfactants may be used. Generally, a polymeric surfactant may be used, either as a sole surfactant or in combination with other surfactants (e.g., non-polymeric surfactants). Examples of suitable surfactants include, but are not limited to, those that are commercially available from Uniqema under the trade names HYPERMER 2296, HYPERMER B246F, and ARLACEL P135. Other examples of suitable surfactants include, but are not limited to, those that are commercially available from Merck under the trade name SPAN 20; in certain embodiments of the present invention SPAN 20 may be used in combination with at least one polymeric surfactant. Generally, suitable surfactants may be present in the organic phase in an amount in the range of from about 20% to about 30% by weight.

The organic phase further comprises at least one crosslinking monomer. As referred to herein, the term "crosslinking monomer" will be understood to mean a monomer having more than one polymerization site thereon. Examples of suitable crosslinking monomers include, inter alia, divinylbenzene, poly(ethylene glycol) dimethacrylate, tri(propylene glycol) diacrylate, 1,4-butanediol diacrylate, ethylene glycol dimethacrylate, and the like. Generally, the at least one crosslinking monomer will be present within the organic phase in an amount in the range of from about 20% to about 80% by weight of the organic phase. In certain embodiments of the present invention, the crosslinking monomer may comprise methacryloxypropyltrimethoxysilane ("MPS"). Where MPS is present as a crosslinking monomer, it generally will be included in combination with another crosslinking monomer. The inclusion of MPS within the organic phase may be particularly suitable in embodiments of the present invention wherein optional filler materials (e.g., glass fibers) are to be included in the composition. Where included, MPS may be present within the organic phase in an amount in the range of from about 0.001% to about 30% by weight of the organic phase.

The organic phase further comprises at least one stress-reducing monomer. As referred to herein, the term "stress-reducing monomer" will be understood to mean a monomer having only one polymerization site thereon. Examples of suitable stress-reducing monomers include, inter alia, styrene, methylmethacrylate, 2-ethylhexyl methacrylate, 2-ethylhexyl acrylate, and the like. Generally, the at least one stress-reducing monomer will be present within the organic phase in an amount in the range of from about 0.001% to about 40% by weight of the organic phase.

The emulsions present in the compositions useful with the present invention further comprise an aqueous phase. A broad variety of nonoleaginous fluids may be used in the aqueous phase including, but not limited to, fresh water, salt water (e.g., water containing one or more salts dissolved therein), brine (e.g., saturated salt water), or seawater. In certain embodiments of the present invention wherein fresh water is present in the aqueous phase, the aqueous phase further may comprise an electrolyte (e.g., hydrochloric acid, sodium hydroxide, or $CaCl_2 \cdot 2H_2O$). In certain of such embodiments, the electrolyte may be present in the aqueous phase in an amount in the range of from about 0.025 mol/L to about 2 mol/L, or the pH of the aqueous phase may be adjusted to vary between about pH 12 and about pH 1. The concentration of the electrolyte generally depends on the chemical composition of the organic phase. Acetic acid also may be present in the aqueous phase. Generally, a suitable nonoleaginous fluid may be from any source provided that it does not contain an excess of compounds that may adversely affect the stability of the emulsion (e.g., compounds such as water-soluble alcohols, acetone, tetrahydrofuran, and the like). Generally, the aqueous phase may comprise from about 60% to about 84% by volume of the emulsions.

Optionally, the compositions useful with the present invention further may comprise filler materials. A broad variety of materials may be suitable for use as filler materials. Suitable filler materials may include, for example, silica-based materials such as short-length glass fibers, carbon-based materials such as short-length carbon fibers and carbon blacks (e.g., PRINTEX®XE2 Extra-Conductive Black, which is commercially available from Degussa Corporation), poly(lactic acid), and alumina. Where included, the filler materials may be incorporated either by directly dispersing them in the organic phase of the emulsion, or by directly dispersing them in the emulsion. In certain optional embodiments of the present invention, the filler materials may be dispersed in the organic phase. Where included, the filler materials may be present in the compositions useful with the present invention in an amount in the range of from about 1% to about 60% by weight of the monomers in the organic phase. For example, in certain embodiments of the present invention wherein carbon black is used as an optional filler material, the carbon black may be present in the compositions useful with the present invention in an amount in the range of from about 1% to about 10% by weight of the monomers in the organic phase. As another example, in certain embodiments of the present invention wherein glass fibers are used as an optional filler material, the glass fibers may be present in the compositions useful with the present invention in an amount in the range of from about 40% to about 60% by weight of the monomers in the organic phase.

Additional examples of compositions that may be useful with the methods of the present invention are disclosed in, for example, U.S. Pat. No. 4,522,953, the relevant disclosure of which is hereby incorporated by reference.

II. Methods of the Present Invention

In certain embodiments of the present invention, the compositions useful with the present invention may be prepared, and placed within a subterranean formation, as follows. The components of the organic phase, the components of the aqueous phase, and any optional materials (e.g., filler materials, and the like) may be mixed with a high-shear mixer to form a composition that comprises a water-in-oil emulsion. The compositions subsequently may be flowed into a desired portion of a subterranean formation (e.g., a desired location in a well bore in the formation) and may be placed in the annular space between a fluid conduit (e.g., a perforated casing, slotted liner, perforated liner, and the like) and the formation. In certain embodiments of the present invention, the compositions may be circulated into position within the formation through the use of a high-pressure pump. The desired position within the formation may be, for example, an annulus in the formation that is defined by the outer surface of the fluid conduit and a screen. In some embodiments, the desired position within the formation may be an annulus that is defined by the outer surface of the fluid conduit and the walls of the well bore. In certain embodiments of the present invention wherein a composition useful with the present invention is used in subterranean operations, the composition may be placed with a screen, or without a screen.

After placement in the formation, the compositions useful with the present invention then may be permitted to polymerize ("cure") therein for a desired time. Curing of the compositions forms a substantially rigid material that is both porous and permeable. The desired time over which the compositions may be permitted to polymerize within the formation may depend on a variety of factors, including, inter alia, the temperature of the subterranean formation, the rate at which heat is transferred from the formation to the composition, and the like. One of ordinary skill in the art, with the benefit of this disclosure, will be able to identify a suitable polymerization time for a particular application. In certain embodiments of the present invention, the compositions may be polymerized within the formation for at least about 12 hours. After the compositions have been permitted to polymerize within the formation for a desired time, hydrocarbons (e.g., oil and/or gas) within the formation may be produced from the formation by flowing through the void-free polymerized composition, into a well bore penetrating the formation, and may flow therefrom to the surface.

Because the compositions useful with the present invention are free-flowing materials, they may behave like liquids (even in embodiments that comprise filler material) to a greater degree than would conventional proppant-laden slurries that are used in traditional gravel packing operations. Generally, particles that may be present within the compositions useful with the present invention may be of such small size that they will not bridge off, or form blockages that could create voids such as those that traditionally are formed by sand and/or proppant particulates in conventional gravel packing operations. Accordingly, the methods of the present invention may facilitate the creation of a substantially void-free, substantially rigid material within the formation. When the compositions useful with the present invention are placed within an annular space in a subterranean formation, the compositions generally will displace substantially the entirety of any fluids resident in the annular space. Accordingly, the annular space generally will become substantially or completely filled with the compositions useful with the present invention, without the presence of voids.

In certain embodiments of the present invention, proper placement of the compositions that comprise water-in-oil emulsions may be facilitated by first treating a desired length of an outer surface of the desired fluid conduit (e.g., a perforated casing, slotted liner, perforated liner, sliding sleeve liner, and the like) in a manner that renders the outer surface impermeable to fluid flow therethrough. Such preparation of the outer surface of the fluid conduit may facilitate, inter alia, circulation and subsequent placement of the compositions useful with the present invention, because such preparation may prevent the compositions from undesirably re-entering the conduit after having been circulated into a desired position within the annular space. The outer surface of the fluid conduit may be rendered impermeable in a number of ways, including, but not limited to, application of a coating, examples of which will be further described herein. The fluid conduit generally will have both an uppermost end and a lowermost end; at least the lowermost end generally will be open (e.g., unsealed). The compositions comprising a water-in-oil emulsion may be pumped through the internal diameter of the conduit, and circulated into place within the annular space. Accordingly, the compositions comprising a water-in-oil emulsion will be disposed along the length of the conduit, between the impermeable outer surface and the well bore walls. At a desired time after the polymerization ("curing") of the compositions, the coating on the outer surface of the fluid conduit may be removed. For example, the coating on the outer surface of the fluid conduit may be a cured coating of wax that desirably melts after having been exposed to subterranean temperatures for a known time period. As another example, the coating on the outer surface of the fluid conduit may be a degradable polymer coating, such as those that comprise polyesters, including, but not limited to, poly(anhydrides), poly(orthoesters), poly(lactic acids) ("PLA's"), poly(glycolic acids), poly(glycolides), poly(lactides), poly(caprolactones), poly (hydroxybutyrates), polyphosphazines, poly(carbonates), polyacetals, polyetheresters, polyesteramides, polycyanoacrylates, polyurethanes, polyacrylates, and blends and copolymers thereof. In the case of PLA-coated fluid conduits, the PLA will begin to degrade to form lactic acid, based on factors such as, inter alia, the temperature of the subterranean formation. The degradation of PLA to form lactic acid, at a desired time following polymerization of the compositions comprising a water-in-oil emulsion, may render the outer surface of the fluid conduit permeable to hydrocarbons that are desired to be produced to the surface. Accordingly, after the coating on the outer surface of the fluid conduit has been removed in the desired fashion, hydrocarbons within the formation desirably may flow through the walls of the well bore, through the polymerized composition, and into the fluid conduit, whereupon they may flow to the surface to be produced.

In certain embodiments, the present invention provides methods for using "breaker" compositions in conjunction with the previously-described compositions comprising a water-in-oil emulsion. The use of a breaker composition may be particularly suitable when the subterranean formation into which the compositions comprising a water-in-oil emulsion are to be placed comprises a filter cake disposed therein (e.g., along the walls of a subterranean well bore). The filter cake disposed in the formation previously may have been established during the drilling of the well bore by a fluid such as, inter alia, a drilling fluid and/or a drill-in fluid. In certain embodiments of the present invention, the "breaker" composition may be used to controllably degrade the filter cake at a desired time. For example, the breaker simply may be included within the compositions comprising water-in-oil emulsions during the formulation of the composition. An example of a suitable breaker may comprise, for example, poly(lactic acid), which may degrade within the subterranean formation at a desired time so as to generate an acid (e.g., lactic acid) that may contact the filter cake and may cause the filter cake to begin to degrade. Generally, the PLA may degrade at a time after the composition has cured; the lactic acid generated may permeate the cured composition, and may contact the filter cake on the well bore walls, and cause the filter cake to degrade. Alternatively, suitable breakers may comprise other degradable compounds besides PLA, provided that such degradable compounds degrade in a desirable fashion once within a subterranean formation. For example, an orthoester may be used. Acids, such as hydrochloric acid, also may be used, e.g., by incorporating the acid into the aqueous phase of the water-in-oil emulsion. After polymerization of the composition comprising a water-in-oil emulsion, the polymerized composition becomes permeable, and the aqueous phase may flow out from the polymerized composition so as to contact the filter cake and degrade it. Among other benefits, this may cause the aqueous phase to evenly contact the filter cake along the entire length of the well bore, which may promote more even degradation of the filter cake.

The compositions useful with the present invention may be used in a variety of applications. For example, the compositions may be placed within perforation tunnels to prevent sand production. The compositions may be placed within natural and created fractures in subterranean formations to stimulate production of fluids therefrom. The compositions also may be used in injection wells as a renewable filtration media. The compositions may be incorporated into a pre-packed screen that may be prepared aboveground, and that subsequently may be placed in a desired location within a subterranean formation. The compositions may be used as a diverting agent, and as a fluid loss control additive. A variety of other uses are possible, as will be recognized by one of ordinary skill in the art, with the benefit of this disclosure.

Furthermore, the compositions useful with the present invention may be combined with expandable screens, inter alia, to fill in void spaces in non-uniform areas of the well bore that otherwise could result in a void space between the well bore walls and the expanded screen. In certain embodiments of the present invention wherein a composition useful with the present invention is used in screenless operations, a flow channel may be created (e.g., drilled, cut, or molded into the composition while the composition polymerizes within the subterranean formation, or after such polymerization has occurred).

To facilitate a better understanding of the present invention, the following examples of some exemplary embodiments are given. In no way should such examples be read to limit, or to define, the scope of the invention.

EXAMPLES

Sample compositions were prepared comprising a 0.034 mol/L $CaCl_2 \cdot 2H_2O$ solution as aqueous phase and an organic phase. The "Organic Phase" concentrations presented in Table 1 were measured relative to the total volume of the emulsion. The ingredient concentrations presented in Table 1 were measured relative to the weight of the organic phase. Each sample composition further comprised 20% by weight of surfactant relative to the organic phase. Sample compositions 13 to 15 further comprised, respectively 60% filler material by weight relative to the organic phase and 1% filler material by weight relative to the organic phase.

TABLE 1

| Sample Composition | Organic Phase (Vol. %) | Divinyl-benzene (Wt %) | MPS (Wt %) | Styrene (Wt %) | Surfactant | Filler |
| --- | --- | --- | --- | --- | --- | --- |
| 1 | 20 | 50 | 0 | 30 | Hypermer 1070 | None |
| 2 | 20 | 50 | 0 | 30 | Hypermer 2296 | None |
| 3 | 16 | 50 | 30 | 0 | Hypermer 1070 | None |
| 4 | 16 | 50 | 17 | 13 | Hypermer 1070 | None |
| 5 | 16 | 55 | 25 | 0 | Hypermer 1070 | None |
| 6 | 16 | 60 | 20 | 0 | Hypermer 1070 | None |
| 7 | 16 | 63 | 17 | 0 | Hypermer 1070 | None |
| 8 | 18 | 60 | 20 | 0 | Hypermer 1070 | None |

TABLE 1-continued

| Sample Composition | Organic Phase (Vol. %) | Divinyl-benzene (Wt %) | MPS (Wt %) | Styrene (Wt %) | Surfactant | Filler |
|---|---|---|---|---|---|---|
| 9 | 20 | 60 | 20 | 0 | Hypermer 1070 | None |
| 10 | 23 | 60 | 20 | 0 | Hypermer 1070 | None |
| 11 | 30 | 60 | 20 | 0 | Hypermer 1070 | None |
| 12 | 40 | 60 | 20 | 0 | Hypermer 1070 | None |
| 13 | 20 | 60 | 20 | 0 | Hypermer 1070 | glass beads |
| 14 | 20 | 40 | 0 | 40 | Hypermer 2296 | carbon black |
| 15 | 40 | 40 | 0 | 40 | Hypermer 2296 | carbon black |

The sample compositions were polymerized at 70° C. and observed for 2 hours, 16 hours and 24 hours. After 2 hours, each sample composition generally had attained a gel-like state. After 16 hours and 24 hours, each sample composition generally had attained a solid, highly porous state.

Certain physical properties of the polymerized sample compositions were measured, and are set forth in Table 2 below. The absolute density measurements set forth below were performed using a Micrometrics AccuPyc 1330 instrument. The envelope density, percent porosity, and specific pore volume were measured using a Micrometrics GeoPyc 1360 instrument. The surface area was measured using a Micrometrics ASAP 2000 surface area analyzer.

TABLE 2

| Sample Composition | Absolute Density (g/cm$^3$) | Envelope Density (g/cm$^3$) | Percent Porosity | Specific Pore Volume (cm$^3$/g) | Surface Area (m$^2$/g) |
|---|---|---|---|---|---|
| 1 | 1.427 | 0.162 | 89 | 5.463 | Not Determined |
| 2 | 1.328 | 0.179 | 87 | 4.981 | 3.33 |
| 3 | 1.278 | 0.174 | 90 | 7.100 | 6.02 |
| 4 | 1.241 | 0.138 | 89 | 6.442 | 3.60 |
| 5 | 1.217 | 0.141 | 88 | 6.282 | 3.15 |
| 6 | 1.078 | 0.141 | 87 | 6.175 | 3.55 |
| 7 | 1.160 | 0.129 | 92 | 7.144 | 5.96 |
| 8 | 1.161 | 0.145 | 87 | 6.032 | 2.60 |
| 9 | 1.176 | 0.177 | 85 | 4.807 | 3.42 |
| 10 | 1.143 | 0.185 | 84 | 4.536 | 3.72 |
| 11 | 1.168 | 0.257 | 78 | 3.043 | 2.63 |
| 12 | 1.15 | 0.309 | 70 | 2.084 | 2.03 |
| 13 | 1.457 | 0.246 | 83 | 3.372 | 2.21 |
| 14 | 1.271 | 0.128 | 90 | 6.961 | 8.44 |
| 15 | 1.162 | 0.112 | 93 | 8.638 | 7.06 |

For certain of the sample compositions, additional testing was performed to determine their elastic properties. The sample compositions tested measured 25 mm in diameter and 10 mm in height. The instrument used was an EZ 250 instrument supplied by Lloyd Instruments Lts. The results are set forth in Table 3 below.

TABLE 3

| Sample Composition | Elastic Modulus (MPa) (wet sample) | Elastic Modulus (MPa) (dry sample) |
|---|---|---|
| 1 | 17 +/− 4 | Not Determined |
| 2 | Not Determined | 42 +/− 4 |
| 4 | Not Determined | 3 +/− 0.3 |
| 12 | 16.7 +/− 0.13 | 24 +/− 4 |
| 13 | Not Determined | 4.3 +/− 0.5 |
| 14 | Not Determined | 8 +/− 1 |
| 15 | Not Determined | 26 +/− 2 |

Photographs of certain sample compositions were made using a JEOL JSM 5610 LV scanning electron microscope (SEM). The sample compositions photographed were covered with a thin gold film using an Emitech K550 instrument.

Figure 2:
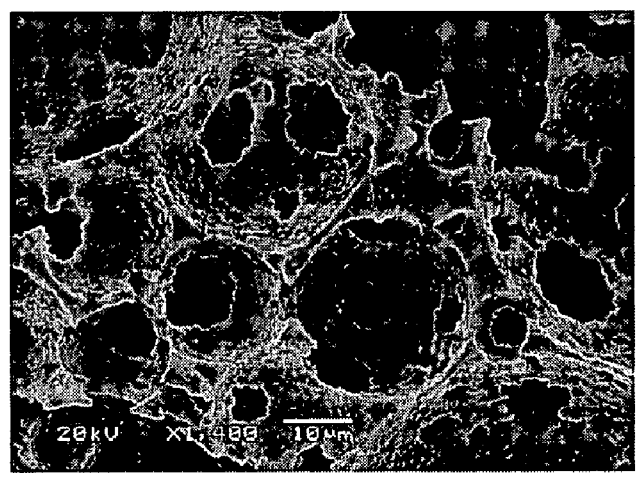
FIG. 2 is a SEM Image of Sample Composition No. 1.

FIG. 1 and FIG. 2 illustrate SEM images of sample composition number 1. The pore diameter lies in the range of 15-80 µm and the pore throat size lies in the range of 3-10 µm.

Example 1 demonstrates, inter alia, that the compositions useful with the present invention may be suitable for use in subterranean formations.

Therefore, the present invention is well adapted to attain the ends and advantages mentioned as well as those which are inherent therein. While the invention has been described with reference to exemplary embodiments of the invention, such a reference does not imply a limitation on the invention, and no such limitation is to be inferred. The invention is capable of considerable modification, alternation, and equivalents in form and function, as will occur to those ordinary skilled in the pertinent arts and having the benefit of this disclosure. The described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method comprising:
   providing a composition that comprises a water-in-oil emulsion, the water-in-oil emulsion comprising a continuous organic phase and an internal aqueous phase, the continuous organic phase comprising a surfactant, an initiator, a crosslinking monomer and a stress-reducing monomer;
   placing the composition in a subterranean formation; and
   permitting the composition to form a permeable, substantially solid material therein.

2. The method of claim 1 wherein the initiator is selected from the group consisting of: α,α'-azoisobutyronitrile; 2,2'-azodi(2-methylbutyronitrile); 2,2-di (4,4-di(tertbutylperoxy)cyclohexyl)propane; and di-cumylperoxide.

3. The method of claim 1 wherein the surfactant is a non-ionic, polymeric surfactant.

4. The method of claim 1 wherein the surfactant comprises a mixture of a polymeric surfactant and a nonpolymeric surfactant.

5. The method of claim 1 wherein the crosslinking monomer is selected from the group consisting of: divinylbenzene, poly(ethylene glycol)dimethacrylate, tri(propylene glycol)diacrylate, 1,4-butanediol diacrylate, and ethylene glycol dimethacrylate.

6. The method of claim 1 wherein the stress-reducing monomer is selected from the group consisting of: styrene, methylmethacrylate, 2-ethyl hexyl methacrylate, and 2-ethylhexyl acrylate.

7. The method of claim 1 wherein the crosslinking monomer comprises methacryloxypropyltrimethoxysilane.

8. The method of claim 1 wherein the internal aqueous phase comprises an electrolyte.

9. The method of claim 1 wherein placing the composition in the formation comprises placing the composition in an annulus defined by the outer surface of a fluid conduit and a screen within the formation.

10. The method of claim 1 wherein the formation comprises a well bore having walls, and wherein placing the composition in the formation comprises placing the composition in an annulus defined by the outer surface of a fluid conduit and the well bore walls.

11. The method of claim 1 wherein permitting the composition to form a permeable, substantially solid material in the formation comprises permitting the composition to polymerize in the formation.

12. The method of claim 1 wherein the composition further comprises a degradable material.

13. The method of claim 1 wherein the degradable material is selected from the group consisting of: a poly(anhydride), a poly(orthoester), a poly(lactic acid), a poly(glycolic acid), a poly(glycolide), a poly(lactide), a poly(caprolactone), a poly(hydroxybutyrate), a polyphosphazine, a poly(carbonate), a polyacetal, a polyetherester, a polyesteramide, a polycyanoacrylate, a polyurethane, a polyacrylate, and blends and copolymers thereof.

14. The method of claim 1 wherein the composition further comprises an acid.

15. A method of producing hydrocarbons from a subterranean formation comprising:
    providing a portion of a subterranean formation comprising a filter cake disposed thereon;
    providing a conduit having a degradable material disposed along its length;
    placing the conduit within the formation;
    providing a composition that comprises a water-in-oil emulsion, the water-in-oil emulsion comprising a continuous organic phase and an internal aqueous phase, the continuous organic phase comprising a surfactant, an initiator, a crosslinking monomer and a stress-reducing monomer;
    circulating the composition into the formation such that the composition is disposed between the filter cake and the degradable material;
    permitting the degradable material to degrade to form a degradation product;
    permitting the degradation product to contact the filter cake;
    permitting the filter cake to degrade; and
    permitting hydrocarbons within the formation to flow through the composition, into the conduit, to the surface.

16. The method of claim 15 further comprising permitting the composition to form a permeable, substantially solid material within the formation.

17. The method of claim 15 wherein the degradable material is selected from the group consisting of: a poly(anhydride), a poly(orthoester), a poly(lactic acid), a poly(glycolic acid), a poly(glycolide), a poly(lactide), a poly(caprolactone), a poly(hydroxybutyrate), a polyphosphazine, a poly(carbonate), a polyacetal, a polyetherester, a polyesteramide, a polycyanoacrylate, a polyurethane, a polyacrylate, and blends and copolymers thereof.

* * * * *